(12) United States Patent
Zhu et al.

(10) Patent No.: US 12,554,706 B2
(45) Date of Patent: Feb. 17, 2026

(54) METHOD AND SYSTEM FOR DATA QUERY

(71) Applicant: ZHEJIANG DAHUA TECHNOLOGY CO., LTD., Zhejiang (CN)

(72) Inventors: Linhao Zhu, Hangzhou (CN); Huihua Shi, Hangzhou (CN); Mingwei Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/783,384

(22) Filed: Jul. 24, 2024

(65) Prior Publication Data

US 2024/0378194 A1  Nov. 14, 2024

Related U.S. Application Data

(63) Continuation of application No. PCT/CN2023/071889, filed on Jan. 12, 2023.

(30) Foreign Application Priority Data

Jan. 25, 2022 (CN) .......................... 202210085931.0

(51) Int. Cl.
*G06F 16/24* (2019.01)
*G06F 16/22* (2019.01)
(Continued)

(52) U.S. Cl.
CPC ...... *G06F 16/2425* (2019.01); *G06F 16/2228* (2019.01); *G06F 16/2282* (2019.01); *G06F 16/24553* (2019.01)

(58) Field of Classification Search
CPC .......... G06F 16/2425; G06F 16/24553; G06F 16/2282
See application file for complete search history.

(56) References Cited

U.S. PATENT DOCUMENTS 10,802,796 B1   10/2020  Bawaskar
2009/0265305 A1  10/2009  Barsness et al.
(Continued)

FOREIGN PATENT DOCUMENTS

CN    1987853 A    6/2007
CN  104102710 A   10/2014
(Continued)

OTHER PUBLICATIONS

The Extended European Search Report in European Application No. 23745978.9 mailed on Jan. 20, 2025, 8 pages.
(Continued)

*Primary Examiner* — Loc Tran
(74) *Attorney, Agent, or Firm* — METIS IP LLC

(57) ABSTRACT

Embodiments of the present disclosure provides a method and a system for data query. The method may include obtaining a query request; determining a first query condition based on the query request; obtaining a field query result relating to a connection field by querying, based on the first query condition, in a full-text retrieval system, wherein the full-text retrieval system may store one or more indexes; determining a second query condition based on the field query result; and obtaining a target query result by querying, based on the second query condition, in a target type database, wherein the target type database may store one or more target type data tables, and the one or more indexes may be associated with data in the one or more target type data tables via the connection field.

19 Claims, 8 Drawing Sheets

(51) Int. Cl.
*G06F 16/242* (2019.01)
*G06F 16/2455* (2019.01)

(56) References Cited

U.S. PATENT DOCUMENTS

| | | | |
|---|---|---|---|
| 2009/0265306 A1 | 10/2009 | Barsness et al. | |
| 2017/0139914 A1* | 5/2017 | Newman | H04L 51/42 |
| 2019/0018896 A1 | 1/2019 | Andhavarapu et al. | |
| 2023/0161744 A1* | 5/2023 | Abbasi | G06F 16/221 |
| | | | 707/747 |

FOREIGN PATENT DOCUMENTS

| | | |
|---|---|---|
| CN | 108920270 A | 11/2018 |
| CN | 110347722 A | 10/2019 |
| CN | 110362549 A | 10/2019 |
| CN | 111061680 A | 4/2020 |
| CN | 111680043 A | 9/2020 |
| CN | 111914066 A | 11/2020 |
| CN | 114491199 A | 5/2022 |
| WO | 2014036684 A1 | 3/2014 |

OTHER PUBLICATIONS

International Search Report in PCT/CN2023/071889 mailed on Apr. 26, 2023, 4 pages.
Written Opinion in PCT/CN2023/071889 mailed on Apr. 26, 2023, 4 pages.
First Office Action in Chinese Application No. 202210085931.0 mailed on Mar. 28, 2025, 17 pages.
The Second Office Action in Chinese Application No. 202210085931.0 mailed on Aug. 12, 2025, 17 pages.

* cited by examiner

400

```
┌─────────────────────────────────────────────────┐
│ Determining a plurality of first shard serial numbers │
│ corresponding to the plurality of index shards and a  │── 410
│ plurality of second shard serial numbers corresponding to │
│ the plurality of target type data table shards        │
└─────────────────────────────────────────────────┘
                         ↓
┌─────────────────────────────────────────────────┐
│ Determining a route value based on the field query result │── 420
│ relating to the connection field                    │
└─────────────────────────────────────────────────┘
                         ↓
┌─────────────────────────────────────────────────┐
│ Determining, based on the route value, a first target serial │
│ number of an index shard of the plurality of index shards │
│ used to store the index data and a second target serial   │── 430
│ number of a target type data table shard of the plurality of │
│ target type data table shards used to store the target type │
│ data                                             │
└─────────────────────────────────────────────────┘
                         ↓
┌─────────────────────────────────────────────────┐
│ Obtaining a plurality of third remainders and a plurality of │
│ fourth remainders by dividing the plurality of first shard  │
│ serial numbers and the plurality of second shard serial    │── 440
│ numbers by a count of the plurality of data nodes,        │
│ respectively                                       │
└─────────────────────────────────────────────────┘
                         ↓
┌─────────────────────────────────────────────────┐
│ Determining whether a third remainder of the plurality of │
│ third remainders is the same as a fourth remainder of the │── 450
│ plurality of fourth remainders                       │
└─────────────────────────────────────────────────┘
                         ↓
┌─────────────────────────────────────────────────┐
│ In response to that the third remainder and the fourth    │
│ remainder are the same, storing the index shard of the   │
│ plurality of index shards corresponding to the third      │
│ remainder and the target type data table shard of the    │── 460
│ plurality of target type data table shards corresponding to │
│ the fourth remainder on a same data node of the plurality │
│ of data nodes                                     │
└─────────────────────────────────────────────────┘
```

FIG. 4

METHOD AND SYSTEM FOR DATA QUERY

CROSS-REFERENCE TO RELATED APPLICATIONS

This application is a Continuation of International Application No. PCT/CN2023/071889, filed on Jan. 12, 2023, which claims priority to Chinese Patent Application No. 202210085931.0, filed on Jan. 25, 2022, the contents of which are incorporated herein by reference in their entirety.

TECHNICAL FIELD

The present disclosure relates to the field of information retrieval, in particular, to a method and a system for data query.

BACKGROUND

Both the full-text retrieval system and the target type database can be used for data storage and data retrieval. In the full-text retrieval system, a document matching the search term submitted by a user terminal is determined based on a pre-established inverted index file, thus the retrieval performance of the full-text retrieval system is good. But the full-text retrieval system is merely suitable for the single table retrieval, and the performance for the association retrieval between tables is weak. The target type database is a data organization composed of two-dimensional tables and relationships of the two-dimensional tables, which is suitable for the multi-table retrieval, and has a strong performance for association retrieval between tables, but the retrieval performance of the target type database is poor. At present, there are two main ways to realize association query based on full-text retrieval system. One is caching an intermediate result set obtained from the query in memory, and then obtaining the final result set by taking the intersection of all intermediate result sets. The other is using the previous query result as the query condition of the next query result, and obtaining the final query result after multiple queries. However, the above two ways both have risk of memory overflow when the intermediate result set has a large amount of data. Moreover, the intermediate result may inevitably involve the network transmission of data, which may have a great impact on the performance.

Therefore, it is desirable to provide a method and a system for data query, thereby facilitating the full-text retrieval and the association retrieval at the same time, and improving user experiences.

SUMMARY

One aspect of the present disclosure may provide a method for data query. The method may include obtaining a query request; determining a first query condition based on the query request; obtaining a field query result relating to a connection field by querying, based on the first query condition, in a full-text retrieval system, wherein the full-text retrieval system may store one or more indexes; determining a second query condition based on the field query result; and obtaining a target query result by querying, based on the second query condition, in a target type database, wherein the target type database may store one or more target type data tables, and the one or more indexes may be associated with data in the one or more target type data tables via the connection field.

Another aspect of the present disclosure may provide a system for data query. The system may include an acquisition module, configured to obtain a query request; a first determination module, configured to determine a first query condition based on the query request; a first query module, configured to obtain a field query result relating to a connection field by querying, based on the first query condition, in a full-text retrieval system, wherein the full-text retrieval system may store one or more indexes; a second determination module, configured to determine a second query condition based on the field query result; and a second query module, configured to obtain a target query result by querying, based on the second query condition, in a target type database, wherein the target type database may stores one or more target type data tables, and the one or more index may be associated with data in the one or more target type data tables via the connection field.

Another aspect of the present disclosure may provide a non-transitory computer readable medium. The non-transitory computer readable medium may store instructions. The instructions, when executed by at least one processor, may cause the at least one processor to implement a method comprising: obtaining a query request; determining a first query condition based on the query request; obtaining a field query result relating to a connection field by querying, based on the first query condition, in a full-text retrieval system, wherein the full-text retrieval system may store one or more indexes; determining a second query condition based on the field query result; and obtaining a target query result by querying, based on the second query condition, in a target type database, wherein the target type database may store one or more target type data tables, and the one or more indexes may be associated with data in the one or more target type data tables via the connection field.

BRIEF DESCRIPTION OF THE DRAWINGS

The present disclosure is further illustrated in terms of exemplary embodiments, and these exemplary embodiments are described in detail with reference to the drawings. These embodiments are not limited. In these embodiments, the same numeral indicates the same structure, wherein:

FIG. 4 is a flowchart illustrating an exemplary process of storing index data, target type data, index shards and target type data table shards according to some embodiments of the present disclosure;

DETAILED DESCRIPTION

Figure 1:
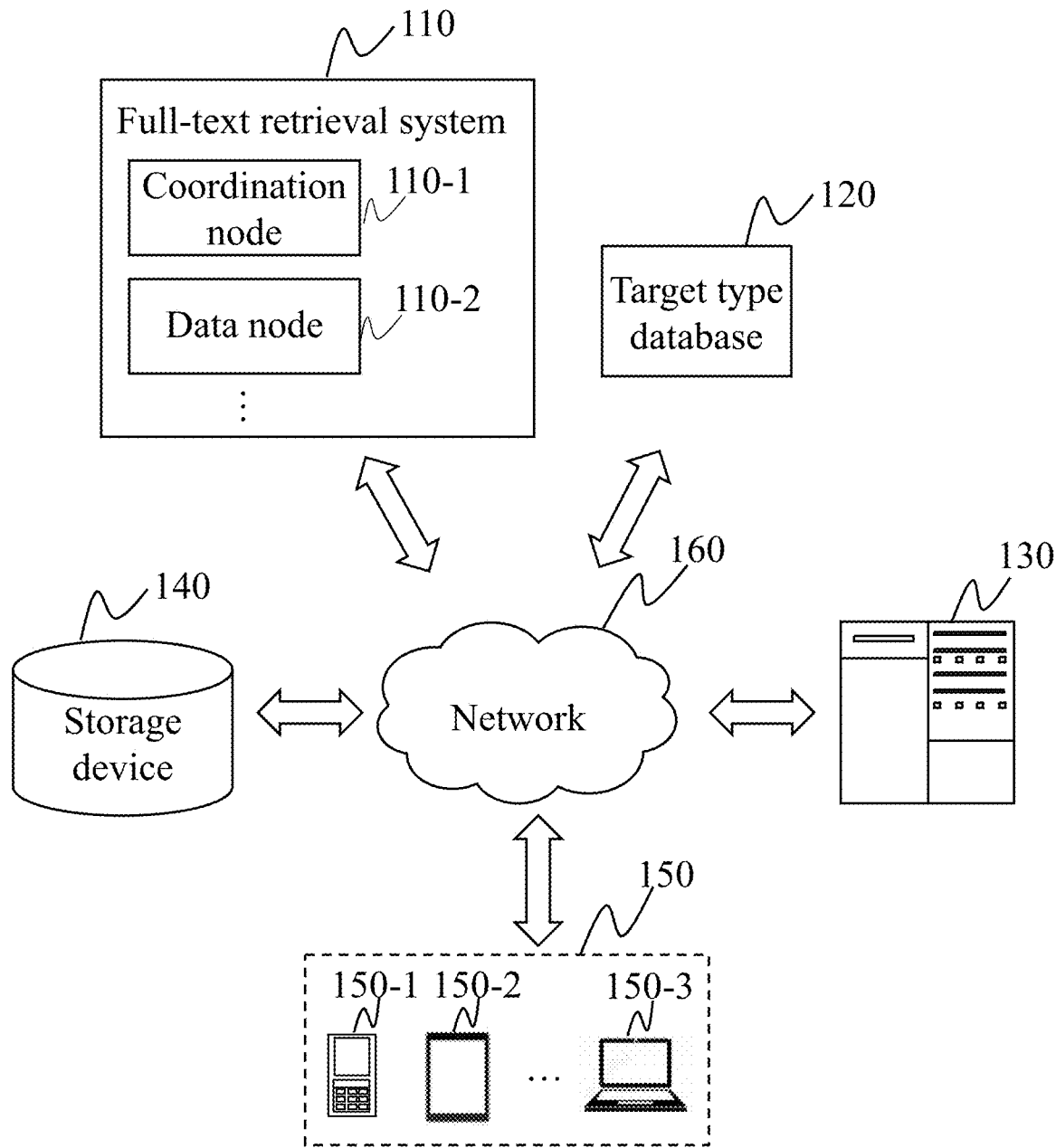
FIG. 1 is a schematic diagram illustrating an exemplary application scenario of a system for data query according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary application scenario 100 of a system for data query according to some embodiments of the present disclosure. In some embodiments, the application scenario 100 of the system for data query may include a full-text retrieval system 110, a target type database 120, a processing device 130, a storage device 140, a user terminal 150 and network 160.

The full-text retrieval system 110 may be used to generate one or more indexes of data and perform a full-text retrieval based on the one or more indexes. In some embodiments, the full-text retrieval system 110 may include an Elasticsearch (ES) system, a Lucene system, a Sphinx system, a Solr system, a Xapian system, a Nutch system, or the like.

In some embodiments, taking the full-text retrieval system 110 as an Elasticsearch system as an example, the full-text retrieval system 110 may include a coordination node 110-1 and a data node 110-2. The coordination node 110-1 may store a location of any document. The coordination node 110-1 may be used to receive a query request sent by the user terminal 150, then forward the query request, collect data and return the data to the user terminal 150. The data node 110-2 may be used to store index data to perform operations related to data (e. g., adding data, reading data, updating data, deleting data, searching data, aggregating data, etc.). In some embodiments, the full-text retrieval system 110 may store one or more indexes. The one or more indexes may include a plurality of index shards stored in distributed locations on a plurality of data nodes.

The target type database 120 may be used for associated query of tables, but may not be used for the full-text retrieval. In some embodiments, the target type database 120 may include ClickHouse database, MySQL database, or the like.

In some embodiments, taking the target type database 120 as the Doris database as an example, the target type database 120 may include a distributed database. In some embodiments, one or more target type data tables may be stored in the target type database, and the one or more target type data tables may include a plurality of target type data table shards stored in distributed locations on a plurality of data nodes. In some embodiments, data in the one or more indexes and data in the one or more target type data tables may be associated with each other through a connection field. In some embodiments, the plurality of index shards may correspond to the plurality of target type data table shards, respectively. The plurality of index shards corresponding to the plurality of target type data table shards respectively may refer that target type data corresponding to a field query result (e.g., a row key value) relating to the connection field in the index data of an index shard may be stored in a corresponding target type data table shard.

The processing device 130 may be used to process data related to data query. For example, the processing device 130 may obtain a query request, determine a first query condition based on the query request, and obtain a field query result relating to a connection field by querying, based on the first query condition, in a full-text retrieval system. The processing device 130 may determine the second query condition based on the field query result, and obtain a target query result by querying in a target type database based on the second query condition.

In some embodiments, the processing device 130 may be a single server or a server group. The server group may be centralized, or distributed. In some embodiments, the processing device 130 may be local or remote. In some embodiments, the processing device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 130 may be integrated or implemented on the user terminal 150.

The storage device 140 may store data, instructions, and/or any other information. In some embodiments, the storage device 140 may store data and/or instructions related to the data query. For example, the storage device 140 may be used to store data acquired and generated during the data query, for example, the query request, the first query condition, the field query result, the second query condition, the target query result, or the like. As another example, the storage device 140 may store instructions for processing the second query condition to determine a target query result.

In some embodiments, the storage device 140 may be connected to the network 160 to communicate with one or more other components (e.g., the full-text retrieval system 110, the target type database 120, the processing device 130, the user terminal 150, or the like) of the application scenario 100 of the system for data query. The one or more components of the application scenario 100 of the system for data query may access data or instructions stored in the storage device 140 via the network 160. In some embodiments, the storage device 140 may be a portion of the processing device 130.

The user terminal 150 may include a mobile device 150-1, a tablet 150-2, a laptop 150-3, or the like, or any combination thereof. In some embodiments, the user terminal 150 may be a portion of the processing device 130. In some embodiments, the user terminal 150 may be used to obtain the query request.

In some embodiments, the user terminal 150 may send and/or receive information related to the data query to the processing device 130 via a user interface. In some embodiments, the user interface may be in the form of an application program for the data query implemented on the user terminal 150. The user interface may be configured to facilitate communication between the user terminal 150 and a user associated with the user terminal 150. In some embodiments, the user terminal 150 may receive an input of a query request from a user to perform the data query via the user interface (e. g., a user interface screen). The user terminal 150 may send the query request for performing the data query to the processing device 130 via the user interface to obtain a target query result.

The network 160 may include any suitable network that may facilitate an exchange of information and/or data in the application scenario 100 of the system for data query. In some embodiments, the full-text retrieval system 110, the target type database 120, the processing device 130, the storage device 140, the user terminal 150, or the like, may transmit information and/or data to one or more other components of the application scenario 100 of the data query system via the network 160.

Figure 2:
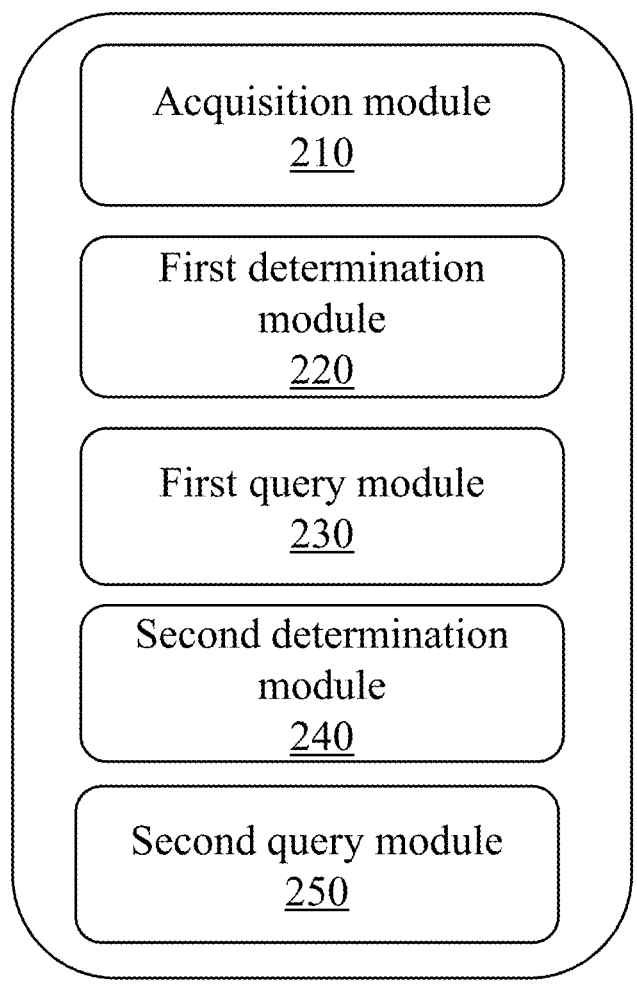
FIG. 2 is a block diagram illustrating an exemplary system for data query according to some embodiments of the present disclosure.

FIG. 2 is a block diagram illustrating an exemplary system for data query according to some embodiments of the present disclosure.

In some embodiments, the system 200 for data query may include an acquisition module 210, a first determination module 220, a first query module 230, a second determination module 240, and a second query module 250.

The acquisition module 210 may be used to obtain a query request.

The first determination module 220 may be used to determine a first query condition based on the query request.

The first query module 230 may be used to obtain a field query result relating to a connection field by querying, based on the first query condition, in a full-text retrieval system, wherein the full-text retrieval system may store one or more indexes. In some embodiments, the field query result relating to the connection field may include a row key value corresponding to the connection field. In some embodiments, the one or more indexes may include a plurality of index shards stored in distributed locations on a plurality of data nodes. In some embodiments, the first query module 230 may further be used to send the query request to the plurality of data nodes to obtain the field query result and a target index shard of the plurality of index shards where the field query result is located by querying, based on the first query condition, in the plurality of index shards. In some embodiments, the first query module 230 may further be used to perform a scrolling retrieval on the plurality of index shards in the plurality of data nodes based on the first query condition simultaneously, and in response to that an amount of data satisfying the first query condition is no less than a first threshold, terminate the scrolling retrieval.

The second determination module 240 may be used to determine a second query condition based on the field query result.

The second query module 250 may be used to obtain a target query result by querying, based on the second query condition, in a target type database, wherein the target type database may store one or more target type data tables, and the one or more indexes may be associated with data in the one or more target type data tables via the connection field. In some embodiments, the target type database may include a distributed database, and the one or more target type data tables may include a plurality of target type data table shards stored in distributed locations on the plurality of data nodes. In some embodiments, the plurality of index shards may correspond to the plurality of target type data table shards. In some embodiments, an index shard of the plurality of index shards and a target type data table shard of the plurality of target type data table shards corresponding to the index shard may be stored in a same data node of the plurality of data nodes. In some embodiments, a count of the plurality of target type data table shards may be a multiple of a count of the plurality of index shards. In some embodiments, the second query module 250 may further be used to query, in a target type data table shard of the plurality of target type data table shards corresponding to the target index shard based on the second query condition. In some embodiments, the second query module 250 may further be used to perform a scrolling retrieval on one or more candidate target type data table shards of the plurality of target type data table shards on the plurality of data nodes based on the second query condition simultaneously, the one or more candidate target type data table shards corresponding to one or more index shards of the plurality of index shards on which data satisfying the first query condition is stored, and in response to that an amount of data satisfying the second query condition is no less than a second threshold, terminate the scrolling retrieval.

In some embodiments, the one or more indexes may store index data, the one or more target type data tables may store target type data, the index data and the target type data may include the connection field, and the index data and the target type data may be stored by: determining a plurality of first shard serial numbers corresponding to the plurality of index shards and a plurality of second shard serial numbers corresponding to the plurality of target type data table shards, determining a route value based on the field query result relating to the connection field, and determining, based on the route value, a first target serial number of an index shard of the plurality of index shards used to store the index data and a second target serial number of a target type data table shard of the plurality of target type data table shards used to store the target type data. In some embodiments, the determining, based on the route value, a first target serial number of an index shard of the plurality of index shards used to store the index data and a second target serial number of a target type data table shard of the plurality of target type data table shards used to store the target type data may include: determining, based on the route value, using a data routing algorithm, the first target serial number of the index shard of the plurality of index shards used to store the index data and the second target serial number of the target type data table shard of the plurality of target type data table shards used to store the target type data, including: obtaining a Hash value by performing a Hash operation on the route value; obtaining a first remainder by dividing the Hash value by a count of the plurality of index shards; designating the first remainder as the first target serial number of the index shard used to store the index data; obtaining a second remainder by dividing the Hash value by a count of the plurality of target type data table shards; and designating the second remainder as the second target serial number of the target type data table shard used to the target type data. In some embodiments, the index shard and the target type data table shard may be stored by: obtaining a plurality of third remainders and a plurality of fourth remainders by dividing the plurality of first shard serial numbers and the plurality of second shard serial numbers by a count of the plurality of data nodes, respectively; determining whether a third remainder of the plurality of third remainders is the same as a fourth remainder of the plurality of fourth remainders; and in response to that the third remainder and the fourth remainder are the same, storing the index shard of the plurality of index shards corresponding to the third remainder and the target type data table shard of the plurality of target type data table shards corresponding to the fourth remainder on a same data node of the plurality of data nodes.

In some embodiments, the index shard and the target type data table shard may be stored by: obtaining a count and locations of the plurality of index shards of the one or more indexes in the full-text retrieval system; generating the one or more target type data tables corresponding to the one or more indexes in the target type database, wherein a count and locations of the plurality of target type data table shards of the one or more target type data tables may correspond to the count and the locations of the plurality of index shards of the one or more indexes. In some embodiments, the generating the one or more target type data tables corresponding to the one or more indexes in the target type database may include: obtaining a count of a plurality of target type data table shards to be generated in the one or more target type data table; determining whether the count of the plurality of target type data table shards to be generated is a multiple of the count of the plurality of index shards of the one or more indexes; in response to that the count of the plurality of target type data table shards to be generated is a multiple of the count of the plurality of index shards of the one or more indexes, obtaining an index shard group and at least one target type data table shard group by sorting and grouping the plurality of index shards and the target type data table shards to be generated, wherein a count of index shards in the index shard groups may be the same as a count of target type data table shards to be generated in the at least one target type data table shard group; designating a location of one of the plurality of target type data table shards to be generated in the at least one target type data table shard group as a location of one of the index shards in the index shard group; and generating a target type data table shard at the location, wherein orders of the target type data table shards to be generated in the at least one target type data table shard group may be the same as orders of the index shards in the index shard group.

More description of the acquisition module 210, the first determination module 220, the first query module 230, the second determination module 240, and the second query module 250, may be found elsewhere in the present disclosure, for example, FIGS. 3-7, and relevant descriptions thereof.

It should be understood that the system and modules shown in FIG. 2 may be implemented in various ways. It should be noted that the above descriptions of determination system and modules is merely for convenience of description, and may not limit the scope of the present disclosure. It can be understood that for those skilled in the art, after understanding the principle of the system, various modules may be arbitrarily combined, or a subsystem to connect with other modules may be formed without departing from this principle. In some embodiments, the acquisition module 210, the first determination module 220, the first query module 230, the second determination module 240 and the second query module 250 disclosed in FIG. 2 may be different modules in a system, or a module may realize the functions of two or more of the above modules. For example, each module may share a storage module, and each module may also have its own storage module. Such changes or modifications are within the scope of the present disclosure.

Figure 3:
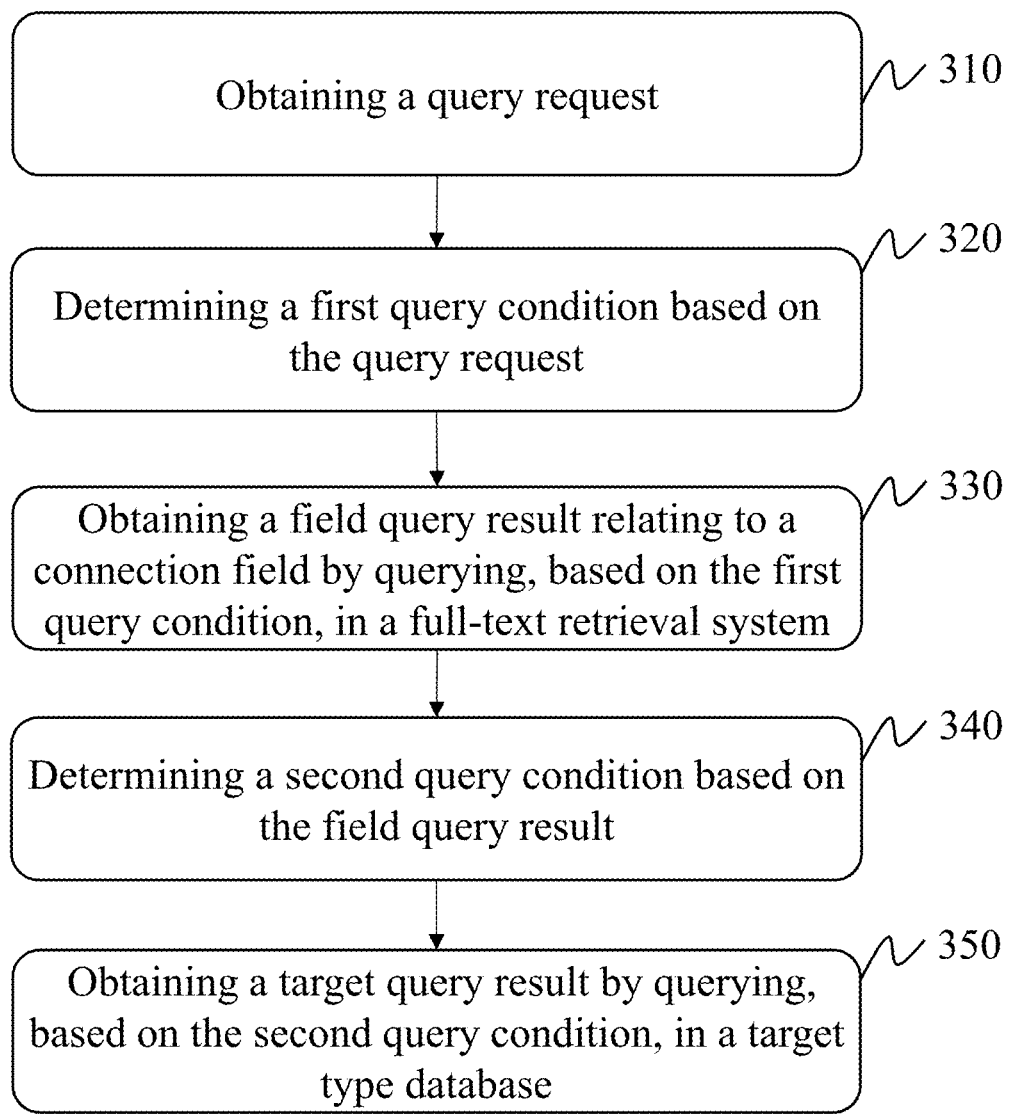
FIG. 3 is a flowchart illustrating an exemplary process of data query according to some embodiments of the present disclosure.

FIG. 3 is a flowchart illustrating an exemplary process of data query according to some embodiments of the present disclosure. As shown in FIG. 3, process 300 may include one or more of the following operations. In some embodiments, one or more operations of the process 300 shown in FIG. 3 may be implemented in the application scenario 100 of the system for data query shown in FIG. 1. For example, the process 300 shown in FIG. 3 may be stored in the storage device 140 in the form of instructions and may be called and/or executed by the processing device 130.

In 310, a query request may be obtained. The operation 310 may be performed by the acquisition module 210.

The query request may refer to a query condition provided by a user. For example, the query request may be "querying data with license plates of 'Chuan A12345' and 'Chuan A54321'". In some embodiments, the query request may include natural language, code language, or the like. The natural language may refer to a language that naturally evolves with the culture, for example, Chinese, English, Japanese, or the like. The code language may refer to computer-readable language instructions, for example, Basic, Pascal, Object Pascal, C language, or the like.

In some embodiments, the processing device 130 may obtain the query request input by the user from the user terminal 150. For example, the user may input a query request of "querying data with license plates of 'Chuan A12345' and 'Chuan A54321'" via the user terminal 150. Thus, the processing device 130 may obtain the query request of "querying data of the license plates of 'Chuan A12345' and 'Chuan A54321'" from the user terminal 150.

In 320, a first query condition may be determined based on the query request. In some embodiments, the operation 320 may be performed by the first determination module 220.

The first query condition may refer to a query condition when querying in the full-text retrieval system. For example, the first query condition may be a query request of "querying data with a license plate 'Chuan A12345'". As another example, the query request may be "querying data with a license plate of 'Chuan A12345' and a vehicle speed exceeding '80 km/h'", but fields in the index are merely "license plate" and "vehicle model", without "vehicle speed". Since the target type database may include the field "vehicle speed", the first query condition may be "querying data with a license plate 'Chuan A12345'". In some embodiments, the first query condition may include natural language, code language, or the like.

In some embodiments, the processing device 130 may divide the query request based on involved fields to obtain the first query condition. For example, the query request is "querying data with a license plate of 'Chuan A12345' and a vehicle speed exceeding '80 km/h'", but the fields in the index are merely "license plate" and "vehicle model", without "vehicle speed". Since the target type database may include the field "vehicle speed", the processing device 130 may divide the query request based on the involved fields (i.e., the "license plate"), and obtain the first query condition "querying data with a license plate 'Chuan A12345'". More description of the index and the field may be found in the operation 330 and the relevant descriptions thereof.

In 330, a field query result relating to a connection field may be obtained by querying, based on the first query condition, in a full-text retrieval system. In some embodiments, the operation 330 may be performed by the first query module 230.

The full-text retrieval system may refer to a software system established according to a theory of full-text retrieval to provide full-text retrieval services. In some embodiments, one or more indexes may be stored in the full-text retrieval system. The data of full-text retrieval system may include structured data and/or unstructured data. The structured data may refer to data with fixed format or limited length, such as database, metadata, or the like. The unstructured data may refer to data with variable length or non-fixed format, such as mail, documents in word format, or the like.

One of the one or more indexes may be a list of logical pointers that indicate a count and locations of each field in a full-text. The one or more indexes may be built for full-text, and may include index pages other than data pages. Rows in each index page may contain logical pointers to speed up data retrieval.

In some embodiments, if the full-text retrieval system includes a data table, the one or more indexes may be generated for each field of the data table. That is, each field data may be stored separately according to a specific structure (e.g., ascending, descending, alphabetical, tree structure, etc.). At the same time, the one or more indexes may store a pointer corresponding to each field value, thus the data in the data table may be queried quickly and efficiently based on the one or more indexes. That is, after a data address corresponding to a target field value is found via the index, required data may be retrieved from the data address. The pointer may represent an address of a corresponding filed value in a data table, that is, a serial number of a row of the corresponding field value in a column where a corresponding field is located in the data table. The target field value may refer to a field value that satisfies a query condition. For example, the data table may be a vehicle information table, including a plurality of rows and a plurality of columns. Fields corresponding to the plurality of columns are "license plate", "vehicle model", "vehicle color", or the like. each of the plurality of columns may include a plurality of field values of a corresponding field. The processing device 130 may generate an index for each field in the vehicle information table and store a pointer corresponding to each field value. If the target field value is "a license plate of 'Chuan A12345'", the pointer may indicate that "the field value of a license plate of 'Chuan A12345' is in the second row of the column corresponding to the field of 'license plate'". That is, various information of the vehicle corresponding to the license plate may be obtained from the data corresponding to the pointer.

In some embodiments, the one or more indexes may include a plurality of index shards stored in distributed locations on a plurality of data nodes. More descriptions of the plurality of index shards may be found elsewhere in the present disclosure, for example, FIGS. 4-6 and the relevant descriptions thereof.

In some embodiments, index data may be stored in the one or more indexes, and the connection field may be included in the index data and target type data. In some embodiments, the full-text retrieval system may only store the index data corresponding to the target type data, and the rest of the data is stored in the target type database, thus the storage space may be effectively saved.

The target type database may be a database including one or more target type data tables that have a large amount of data and are not suitable for full-text retrieval. In some embodiments, the one or more target type data tables may be stored in the target type database. The one or more target type data tables may be associated with each other.

The one or more target type data tables may include a partitioned table with a large amount of data or a table including a plurality of table shards. For example, a vehicle capture information table may store data within a day in a partition. In some embodiments, target type data may be stored in the one or more target type data tables.

In some embodiments, the target type database may include a distributed database. The distributed database may refer to a database system in which data are distributed physically and managed logically. The one or more target type data tables may include a plurality of target type data table shards stored in distributed locations on the plurality of data nodes. More descriptions of the plurality of target type data table shards may be found elsewhere in the present disclosure, for example, FIGS. 4-6, and the relevant descriptions thereof.

In some embodiments, the plurality of index shards may correspond to the plurality of target type data table shards respectively, and an index shard of the plurality of index shards and a target type data table shard of the plurality of target type data table shards corresponding to the index shard may be stored in a same data node of the plurality of data nodes. A count of the plurality of target type data table shards may be a multiple of a count of the plurality of index shards. The count of the plurality of index shards may be an integer multiple of a count of the plurality of data nodes. More descriptions of the relationship between the plurality of index shards and the plurality of target type data table shards and a storage of the plurality of index shards and the plurality of target type data table shards may be found elsewhere in the present disclosure, for example, FIGS. 4-6, and the relevant descriptions thereof.

The connection field may be a field that associates the one or more indexes with the one or more target type data tables. For example, the one or more target type data table is a vehicle capture information table, which includes field data such as "license plate". The full-text retrieval system may generate the one or more indexes with fields such as "license plate", "vehicle model" and "vehicle color", and the connection field may be the "license plate".

The field query result may refer to a result obtained by querying, based on the connected field, in the one or more indexes. For example, the field query result may be "a row key value of A.2", representing the second row of the column where the connection field is located in target type data table A. In some embodiments, the field query result relating to the connection field may include a row key value corresponding to the connection field. For example, the field query result relating to the connection field may include a target field value of the connection field and the row key value corresponding to the target field value. The row key value may include an address of the connection field in the target type data table, that is, a data address of the connection field in the target type data table. In some embodiments, a count of the row key value may be one or more, and the row key value may associate the target field value of the connection field with a certain record in the target type data table.

In some embodiments, the processing device 130 may send the query request to the plurality of data nodes, and obtain the field query result and a target index shard of the plurality of index shards where the field query result is located by querying, based on the first query condition, in the plurality of index shards. For example, the processing device 130 may send a query request to the plurality of data nodes, and obtain the field query result of "a row key value of A.2" and a serial number of the target index shard where the field query result is located (e.g., index shard 0, index shard 1) by querying, based on the first query condition "querying the data with a license plate of 'Chuan A12345'" in the plurality of index shards. More descriptions of the relationship and storage of the plurality of data nodes, the plurality of index shards and the plurality of target type data table shards may be found elsewhere in the present disclosure, for example, FIGS. 4-6, and the relevant descriptions thereof.

In some embodiments, the processing device 130 may perform a scrolling retrieval on the plurality of index shards in the plurality of data nodes based on the first query condition simultaneously, and in response to that an amount of data satisfying the first query condition is no less than a first threshold, terminate the scrolling retrieval. Specifically, the full-text retrieval system may forward the query request to the plurality of data nodes where the plurality of index shards are distributed based on the plurality of locations of the plurality of index shards in the one or more indexes. The plurality of data nodes may determine the first query condition based on the query request to perform a scrolling retrieval on the plurality of index shards, and terminate the scrolling retrieval in response to that the amount of data satisfying the first query condition is no less than the first threshold. The plurality of data nodes may send a set of serial numbers of the plurality of index shards storing the data satisfying the first query condition and the row key value(s) of the data satisfying the first query condition determined by the plurality of data nodes to the full-text retrieval system, thereby realizing determining the first query condition based on the query request and the scrolling retrieval of the plurality of index shards in the one or more indexes on the plurality of data nodes.

For example, the plurality of index shards in the one or more indexes include index shard 0, index shard 1, index shard 2, index shard 3, index shard 4, and index shard 5. The index shard 0 and index shard 1 are distributed on data node 1, the index shard 2, and index shard 3 are distributed on data node 2, and the index shard 4 and index shard 5 are distributed on data node 3. The full-text retrieval system may forward the query request to the data node 1, the data node 2 and the data node 3. After receiving the query request, data node 1, data node 2 and data node 3 may determine the first query condition based on the query request and perform a scrolling search on the index shard 0, index shard 1, index shard 2, index shard 3, index shard 4, and index shard 5 in the one or more indexes, and determine that the index shards that store the data satisfying the first query condition are index shard 0 and index shard 2, and determine that the row key values of the data satisfying the first query condition stored in the index shard 0 are A, B, C (i.e., the index shard 0 (row key values: A.2, B.4, C.1)), and the row key values of data satisfying the first query condition stored in the index shard 2 is Q (i.e., the index shard 2 (row key value: Q.10)). The amount of data satisfying the first query condition is 4, which is no less than the first threshold (e.g., 3), and the scrolling retrieval may be terminated. The index shard 0 (row key values: A, B, C) and index shard 2 (row key value: Q) may be sent to the full-text retrieval system.

In 340, a second query condition may be determined based on the field query result. In some embodiments, the operation 340 may be performed by the second determination module 240.

The second query condition may refer to a query condition of querying in the target type database. For example, the second query condition may be a field query result of "a row key value of A.2". As another example, the query request may be "querying data with a license plate of 'Chuan A12345' and a vehicle speed exceeding '80 km/h'", but fields in the index are merely "license plate" and "vehicle model", without "vehicle speed". The target type database may include the field "vehicle speed", and thus, the second query condition may be "querying data of a field query result of 'a row key value of A.2' and vehicle speed exceeding '80 km/h'". In some embodiments, the first query condition may include natural language, code language, or the like.

In some embodiments, the processing device 130 may divide the query request based on the involved fields, and obtain the second query condition in combination with the field query result. For example, the query request is "querying data with a license plate of 'Chuan A12345' and a vehicle speed exceeding '80 km/h'", but the fields in the index are merely "license plate" and "vehicle model", without "vehicle speed". The target type database may include the field "vehicle speed", and thus, the processing device 130 may divide the query request based on the involved fields (i.e., the "vehicle speed"), and obtain the second query condition "querying data of a field query result of 'a row key value of A.2' and vehicle speed exceeding '80 km/h'" in combination with the field query result.

In 350, a target query result may be obtained by querying, based on the second query condition, in a target type database. In some embodiments, the operation 350 may be performed by the second query module 250.

The target query result may refer to a final query result corresponding to the query request. In some embodiments, the target query result may be a query result obtained in the full-text retrieval system based on the first query condition, and/or the query result obtained in the target type database based on the second query condition. For example, the query request is "querying data with a license plate of 'Chuan A12345' and a vehicle speed exceeding '80 km/h'". The fields in the index are "license plate" and "vehicle model", and the target type database includes the field "vehicle speed". Then the processing device 130 may designate the "vehicle model" with the license plate of "Chuan A12345" as the query result obtained in the full-text retrieval system, and designate the data with the license plate of "Chuan A12345" and the vehicle speed exceeding "80 km/h" obtained in the target type database based on the field query result as the query result obtained in the target type database. The query result obtained in the full-text retrieval system and the query result obtained in the target type database may be combined to obtain the target query result. As another example, the query request is "querying data with a license plate of 'Chuan A12345' and the vehicle speed exceeds '80 km/h'". The field in the index is "license plate", and the target type database includes the field "vehicle speed". Then the processing device 130 may designate the data with the license plate of "Chuan A12345" and the vehicle speed exceeding "80 km/h" obtained in the target type database based on the field query result as the target query result. As another example, the query request is "querying data with a license plate of 'Chuan A12345' and the vehicle speed exceeds '80 km/h'". The field in the index is "license plate", and the target type database includes the field "vehicle speed". If the field query result obtained in the full-text retrieval system based on the first query condition is null, the target query result may be null.

In some embodiments, the processing device 130 may query, in a target type data table shard of the plurality of target type data table shards corresponding to the target index shard based on the second query condition. For example, the second query condition is "a row key value of A.2", the target index shard of the plurality of index shards is index shard 1, and the target type data table shard of the plurality of target type data table shards corresponding to the target index shard is target type data table shard 1. Then the processing device 130 may query, in the target type data table shard 1 based on the second query condition "a row key value of A.2" to obtain the target query result.

In some embodiments, the processing device 130 may query, based on the second query condition, one or more candidate target type data table shards of the plurality of target type data table shards corresponding to one or more index shards of the plurality of index shards on which data satisfying the first query condition is stored in the target type database after retrieving the full-text retrieval system based on the first query condition, and determining a set of the one or more index shards of the plurality of index shards on which data satisfying the first query condition is stored and row key values of data satisfying the first query condition.

In some embodiments, the processing device 130 may perform a scrolling retrieval on one or more candidate target type data table shards of the plurality of target type data table shards on the plurality of data nodes based on the second query condition simultaneously. The one or more candidate target type data table shards may correspond to one or more index shards of the plurality of index shards on which data satisfying the first query condition is stored. Then, the processing device 130 may terminate the scrolling retrieval in response to that an amount of data satisfying the second query condition is no less than a second threshold. A value of the second threshold may be equal to or different from a value of the first threshold. For example, after receiving a set of serial numbers of the one or more index shards of the plurality of index shards on which data satisfying the first query condition is stored and row key values of data satisfying the first query condition sent by the plurality of data nodes, the full-text retrieval system may forward the set of serial numbers of the one or more index shards of the plurality of index shards on which data satisfying the first query condition is stored and row key values of data satisfying the first query condition to the target type database. The target type database may determine the one or more candidate target type data table shards corresponding to the one or more index shards on which data satisfying the first query condition is stored based on the serial numbers of the one or more index shards on which data satisfying the first query condition is stored. According to locations of the one or more candidate target type data table shards corresponding to the one or more index shards on which data satisfying the first query condition is stored, the second query condition may be forwarded to the plurality of data nodes on which the one or more candidate target type data table shards are distributed. The plurality of data nodes may perform scrolling retrieval on the one or more candidate target type data table shards according to the second query condition, and terminate scrolling retrieval in response to that an amount of data satisfying the second query condition is no less than the second threshold. Serial numbers of one or more target type data table shards that are determined by the plurality of data nodes and storing the data satisfying the second query condition may be sent to the target type database, thus the scrolling retrieval of the one or more candidate target type data table shards corresponding to the one or more index shards on which data satisfying the first query condition is stored may be performed on the plurality of data nodes based on the second query condition.

For example, the plurality of target type data table shards in the one or more target type data tables corresponding to the one or more indexes include target type data table shard 0, target type data table shard 1, target type data table shard 2, target type data table shard 3, target type data table shard 4, and target type data table shard 5. The target type data table shard 0 and the target type data table shard 3 are distributed on data node 1. The target type data table shard 1 and the target type data table shard 4 are distributed on data node 2. The target type data table shard 2 and the target type data table shard 5 are distributed on data node 3. After receiving the index shard 0 (row key values: A.2, B.4, C.1) and index shard 2 (row key value: Q.10) sent by the full-text retrieval system, the target type database may determine that the candidate target type data table shards corresponding to index shard 0 and index shard 2 on which data satisfying the first query condition is stored is the target type data table shard 0 and the target type data table shard 2, respectively. The second query condition may be forwarded to the data node 1 on which the target type data table shard 0 is distributed and the data node 3 on which the target type data table shard 2 is distributed. The second query condition is querying data including row key value A.2, row key value B.4 or row key value C.1 in target type data table shard 0; querying data including row key value Q.10 in target type data table shard 2. After receiving the second query condition, the data node 1 and the data node 2 may perform a scrolling retrieval on target type data table shard 0 and target type data table shard 2 based on the second query condition, and determine that the target type data table shard on which data satisfying the second query condition is stored is the target type data table shard 0 (row key values: A.2, B.4, C.1). Then the amount of data satisfying the second query condition is 3, which is no less than the second threshold (e.g., 3), and the scrolling retrieval may be terminated. The target type data table shard 0 (row key values: A.2, B.4, C.1) may be sent to the target type database. The target type database may determine that the target type data table shard on which data satisfying the first query condition is stored is the target type data table shard 0, and return the target query result to the user terminal 150. The target query result may include the one or more index shards (e.g., the index shard 0 and index shard 2) on which data satisfying the first query condition is stored, and the target type data table shard (e.g., the target type data table shard 0) on which the data satisfying the second query condition is stored.

By combining the full-text retrieval system with the target type database, the second query condition may be determined based on the field query result satisfying the first query condition after the full-text retrieval system is retrieved to determine the one or more index shards of the plurality of index shards on which data satisfying the first query condition is stored. Then, the one or more candidate target type data table shards corresponding to the target index shard(s) in the target type database may be queried to determine the target query result that satisfies the second query condition, thus both the full-text retrieval and association retrieval is suitable, and the user experience may be improved.

It should be noted that the above description of data query is merely for illustration, and does not limit the scope of the present disclosure. For those skilled in the art, various modifications and changes may be made to the process data query under the guidance of the present disclosure. However, these modifications and changes are still within the scope of the present disclosure. In some embodiments, the operations 320 and 340 may be omitted.

FIG. 4 is a flowchart illustrating an exemplary process of storing index data, target type data, index shards and target type data table shards according to some embodiments of the present disclosure. As shown in FIG. 4, process 400 may include one or more of the following operations. In some embodiments, one or more operations of the process 400 shown in FIG. 4 may be implemented in the application scenario 100 of the system for data query shown in FIG. 1. For example, the process 400 shown in FIG. 4 may be stored in the storage device 140 in the form of instructions, and may be called and/or executed by the processing device 130.

In 410, a plurality of first shard serial numbers corresponding to the plurality of index shards and a plurality of second shard serial numbers corresponding to the plurality of target type data table shards may be determined.

One of the plurality of index shards may refer to a data block obtained by dividing data in the one or more indexes. In some embodiments, the plurality of index shards may be distributed on different data nodes.

The plurality of first shard serial numbers may refer to a plurality of serial numbers corresponding to the plurality of index shards, for example, index shard 0, index shard 1, index shard 2, or the like.

In some embodiments, the processing device 130 may divide the data in the one or more indexes into a plurality of data blocks, each of the plurality of data blocks may correspond to one of the plurality of index shards. The plurality of data blocks may be numbered to obtain the plurality of first shard serial numbers. In some embodiments, a count of the plurality of index shards may be a value input by the user or a preset default value.

One of the plurality of target type data table shards may refer to a data block obtained by dividing data in the one or more target type data tables. In some embodiments, the plurality of target type data table shards may be distributed on different data nodes.

The plurality of second shard serial numbers may refer to a plurality of serial numbers corresponding to the plurality of the target type data table shards, for example, target type data table shard 0, target type data table shard 1, target type data table shard 2, or the like.

In some embodiments, the processing device 130 may divide the data in the one or more target type data tables into the plurality of data blocks, and each of the plurality of data blocks may correspond to one of the plurality of target type data table shards. The plurality of target type data table shards may be numbered to obtain the plurality of second shard serial numbers. In some embodiments, a count of the plurality of target type data table shards may be a value input by the user or a preset default value, and the count of the plurality of target type data table shards may be a multiple of the count of the plurality of index shards.

In 420, a route value may be determined based on the field query result relating to the connection field.

The route value may refer to a value indicating a serial number of one of the plurality of index shards used to store the index data and a serial number of one of the plurality of target type data table shards used to store the target type data. In some embodiments, the route value may include the field query result relating to the connection field. In some embodiments, the route value may include the row key value of the connection field.

In some embodiments, the processing device 130 may designate the row key value relating to the connection field stored in the index data and the target type data as the route value.

In 430, based on the route value, a first target serial number of an index shard of the plurality of index shards used to store the index data and a second target serial number of a target type data table shard of the plurality of target type data table shards used to store the target type data may be determined.

The first target serial number may refer to a serial number corresponding to an index shard of the plurality of index shards used to store the index data. The second target serial number may refer to a serial number corresponding to a target type data table shard of the plurality of target type data table shards used to store the target type data.

In some embodiments, the processing device 130 may obtain a Hash value by performing a Hash operation on the route value. Then, the processing device 130 may obtain a first remainder by dividing the Hash value by a count of the plurality of index shards, and designate the first remainder as the first target serial number of the index shard used to store the index data. Then, the processing device 130 may obtain a second remainder by dividing the Hash value by a count of the plurality of target type data table shards, and may designate the second remainder as the second target serial number of the target type data table shard used to store the target type data.

For example, the processing device 130 may obtain a Hash value by performing a Hash operation on the route value through a Murmur3Hash algorithm. Then, a first modulus (i.e., the first remainder) may be obtained by dividing the Hash value by a count of the plurality of index shards (i.e., ShardNumber), and then the first modulus may be designated as the first target serial number of the index shard used to store the index data, that is, Math.floorMod (Murmur3HashFunction.hash (Routing), ShardNumber). Then, a second modulus (i.e., the second remainder) may be obtained by dividing the Hash value by a count of the plurality of target type data table shards (i.e., TabletNumber), and then the second modulus may be designated as the second target serial number of the target type data table shard used to store the target type data, that is, Math.floorMod (Murmur3HashFunction.hash (Routing), TabletNumber)

In 440, a plurality of third remainders and a plurality of fourth remainders may be obtained by dividing the plurality of first shard serial numbers and the plurality of second shard serial numbers by a count of the plurality of data nodes, respectively.

In some embodiments, the processing device 130 may determine the count of the plurality of data nodes based on a value input by the user or a preset default value.

The plurality of third remainders may refer to a plurality of remainders obtained by dividing the plurality of first shard serial numbers by the count of the plurality of data nodes. The plurality of fourth remainders may refer to a plurality of remainders obtained by dividing the plurality of second shard serial numbers by the count of the plurality of data nodes.

In 450, whether a third remainder of the plurality of third remainders is the same as a fourth remainder of the plurality of fourth remainders may be determined.

In 460, in response to that the third remainder and the fourth remainder are the same, the index shard of the plurality of index shards corresponding to the third remainder and the target type data table shard of the plurality of target type data table shards corresponding to the fourth remainder may be stored on a same data node of the plurality of data nodes.

The index shard corresponding to the third remainder may refer to an index shard corresponding to the first shard serial number that is the same as the third remainder. The target type data table shard corresponding to the fourth remainder may refer to the target type data table shard corresponding to the second shard serial number that is the same as the fourth remainder. For example, if the third remainder is 2, the index shard corresponding to the third remainder may be index shard 2. If the fourth remainder is 1, the target type data table shard corresponding to the fourth remainder may be target type data table shard 1.

Figure 6A:
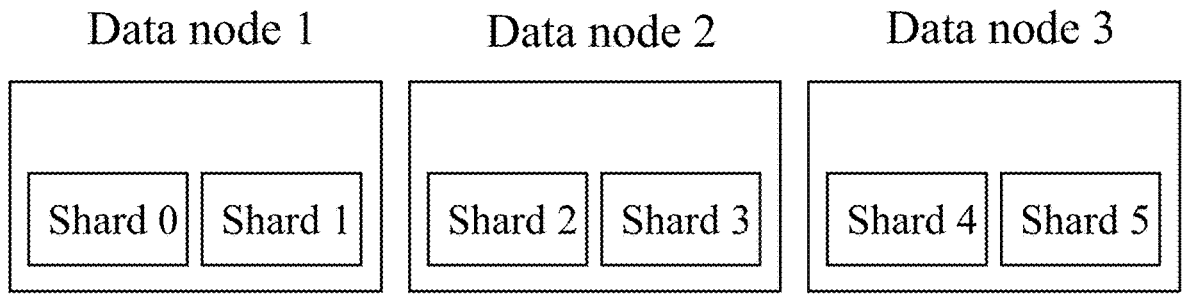
FIG. 6A is a schematic diagram illustrating an exemplary distribution of index shards according to some embodiments of the present disclosure.
Figure 6B:
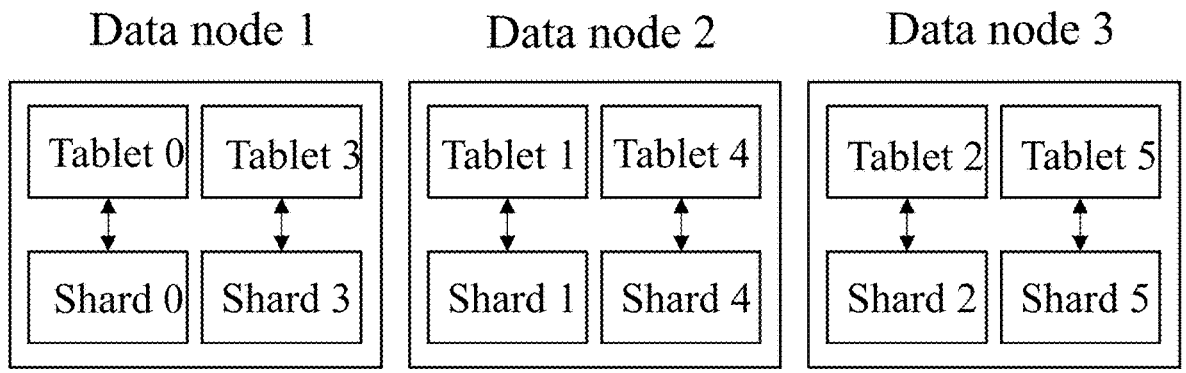
FIG. 6B is a schematic diagram illustrating an exemplary distribution of index shards and target type data table shards according to some embodiments of the present disclosure.
Figure 6C:
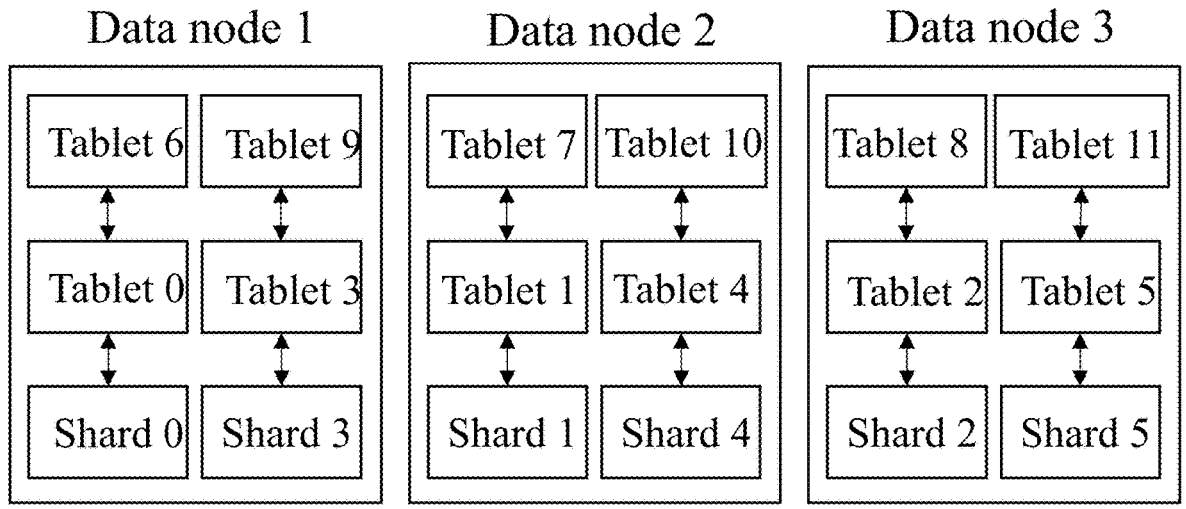
FIG. 6C is another schematic diagram illustrating an exemplary distribution of index shards and target type data table shards according to some embodiments of the present disclosure.

In some embodiments, the processing device 130 may store the index shard of the plurality of index shards corresponding to the third remainder and the target type data table shard of the plurality of target type data table shards corresponding to the fourth remainder on a same data node of the plurality of data nodes. For example, as shown in FIG. 6B, the plurality of data nodes may include data node 1, data node 2 and data node 3, and the count of the plurality of data nodes is 3. The plurality of index shards may include shard 0, shard 1, shard 2, shard 3, shard 4, and shard 5. The plurality of target type data table shards may include Tablet 0, Tablet 1, Tablet 2, Tablet 3, Tablet 4, and Tablet 5. Then the third remainder obtained by dividing the first shard serial number 0 corresponding to shard 0 by the count of the plurality data nodes of 3 is 0, and the third remainder obtained by dividing the first shard serial number 1 corresponding to shard 1 by the count of the plurality data nodes of 3 is 1. Thus, the processing device 130 may determine that the plurality of third remainders corresponding to shard 0, shard 1, shard 2, shard 3, shard 4 and shard 5 are 0, 1, 2, 0, 1, and 2, respectively, and the plurality of fourth remainders corresponding to Tablet 0, Tablet 1, Tablet 2, Tablet 3, Tablet 4, and Tablet 5 are 0, 1, 2, 0, 1, and 2, respectively. Then the shard 0, shard 3, Tablet 0 and Tablet 3 may be stored on data node 1, shard 1, shard 4, Tablet 1 and Tablet 4 may be stored on data node 2, and shard 2, shard 5, Tablet 2 and Tablet 5 may be stored on data node 3. As another example, as shown in FIG. 6C, the plurality of data nodes may include data node 1, data node 2 and data node 3, and the count of the plurality of data nodes is 3. The plurality of index shards may include shard 0, shard 1, shard 2, shard 3, shard 4, and shard 5. The plurality of target type data table shards may include Tablet 0, Tablet 1, Tablet 2, Tablet 3, Tablet 4, Tablet 5, Tablet 6, Tablet 7, Tablet 8, Tablet 9, Tablet 10, and Tablet 11. Thus, the processing device 130 may determine that the plurality of third remainders corresponding to shard 0, shard 1, shard 2, shard 3, shard 4, and shard 5 are 0, 1, 2, 0, 1, 2, respectively, and the plurality of fourth remainders corresponding to Tablet 0, Tablet 1, Tablet 2, Tablet 3, Tablet 4, Tablet 5, Tablet 6, Tablet 7, Tablet 8, Tablet 9, Tablet 10, and Tablet 11 are 0, 1, 2, 0, 1, 2, 0, 1, 2, 2, and 2, respectively. Then shard 0, shard 3, Tablet 0, Tablet 3, Tablet 6, and Tablet 9 may be stored on data node 1, shard 1, shard 4, Tablet 1, Tablet 4, Tablet 7, and Tablet 10 may be stored on data node 2, and shard 2, shard 5, Tablet 2, Tablet 5, Tablet 8, and Tablet 11 may be stored on data node 3.

Since the count of the plurality of target type data table shards is a multiple of the count of the plurality of index shards, and the count of the plurality of index shards is an integer multiple of the count of the plurality of data nodes, the index data and the target type data with the same route value in the one or more indexes and the one or more target type data tables may be stored on a same data node. For the index data and target type data with the same route value, the Hash values obtained through the same Hash operations may be the same. One of the plurality of first target serial numbers may correspond to one of the plurality of second target serial numbers determined based on the same Hash value, and the index data and target type data with the same route value may be distributed on the same data node for storage. Correspondence of the first target serial number and the second target serial number determined based on the same Hash value may refer that the first target serial number and the second target serial number divided by the count of the plurality of data nodes have the same remainder, that is, the index shard and the target type data table shard corresponding to the first target serial number and the second target serial number respectively may be stored on the same data node. The reasons for the correspondence of the first target serial number and the second target serial number determined based on the same Hash value are as follows:

If h refers to the Hash value, n refers to the count of the plurality of data nodes, mn refers to the count of the plurality of index shards, kmn refers to the count of the plurality of target type data table shards, m and k are natural numbers no less than 1, there may be following three cases:

(1) h>kmn, the first remainder (a) may be represented as: h÷mn=kg remaining a. The second remainder (b) may be represented as: h÷kmn=g remaining b, where h refers to the Hash value, n refers to the count of the plurality of data nodes, mn refers to the count of the plurality of index shards, kmn refers to the count of the plurality of target type data table shards, m and k are natural numbers no less than 1, and g is a natural number not less than 1. That is, h−a/mn=kg, h−b/kmn=g, the first target serial number a=h−mnkg, and the second target serial number b=h−mnkg, thus the index shard and the target type data table shard corresponding to the first target serial number and the second target serial number respectively may be stored in the same data node.

(2) h<mn, g=0, a=b=h, thus the index shard and the target type data table shard corresponding to the first target serial number and the second target serial number respectively may be stored in the same data node.

(3) mn<h<kmn, a=h−mnkg (the determination of a is the same as in case (1), b=h. Since an index shard with a serial number and a target type data table shard with a serial number that differ by an integer multiple of n from the serial number of the index shard are placed in the same data node (e.g., shard 0, Tablet 0, Tablet n, Tablet 2n . . . Tablet (k−1) n are stored on data node 1; shard 1, Tablet 1, Tablet (n+1), Tablet (2n+1) . . . Tablet ((k−1) n+1) are stored on data node 2), a difference between a and b is mnkg, which is an integral multiple of n, thus the index shard and the target type data table shard corresponding to the first target serial number and the second target serial number respectively may be stored in the same data node.

By determining the first target serial number of the index shard used to store the index data and the second target serial number of the target type data table shard used to store the target type data, the index shard corresponding to the third remainder and the target type data table shard corresponding to the fourth remainder that is the same as the third remainder may be stored on the same data node. The data with the same route value in the one or more indexes and the one or more target type data tables may be stored on the same data node. Therefore, there may be no need to migrate data across nodes, reducing the network overhead and improving the retrieval performance.

It should be noted that the above description of storing the plurality of index shards and the plurality of target type data table shards is merely for illustration, and does not limit the scope of the present disclosure. For those skilled in the art, various modifications and changes may be made to process of storing the plurality of index shards and the plurality of target type data table shards under the guidance of the present disclosure. However, these modifications and changes are still within the scope of the present disclosure. In some embodiments, the operations 440 to 460 may be performed before the operations 410 to 430. In some embodiments, the operations 440 to 460 may be performed synchronously with the operations 410 to 430. In some embodiments, the operations 440 to 460 may be omitted, and the plurality of index shards and the plurality of target type data table shards may be stored according to other operations. More description of other operations may be found elsewhere in the present disclosure, for example, FIG. 5 and the relevant descriptions thereof. In some embodiments, the operations 410 to 430 may be omitted. After performing the operations 440 to 460, the target type data and the index data may be stored according to the following operations.

In some embodiments, the processing device 130 may divide (e.g., evenly dividing, unevenly dividing, etc.) a plurality of pieces of target type data in the one or more target type data tables into a plurality of target type data groups based on the count of the plurality of data nodes. Each of the plurality of target type data groups may be stored on a target type data table shard of a data node (e.g., designating a target type data table shard), and one of a plurality of pieces of index data corresponding to one of the plurality of pieces of target type data in the plurality of target type data groups may also be stored on an index shard corresponding to the data node. The index data corresponding to the target type data may refer to the index data associated with the target type data via the connection field.

By evenly storing the plurality of pieces of target type data in the one or more target type data tables on the plurality of data nodes, the resource usage of each of the plurality of data nodes may be more balanced, and the query efficiency of concurrent query of each data node may be improved, thus avoiding too long query time caused by too much target type data on a data node.

In some embodiments, when dividing the plurality of pieces of target type data in the one or more target type data tables, the processing device 130 may further divide the target type data based on the field value of the connection field (such as the field value "Chuan A00001", "Chuan A00002", of the connection field "license plate") to obtain the plurality of target type data groups. For example, the processing device 130 may sort (e.g., in ascending or descending order) the plurality of pieces of target type data based on the field value of the connection field, and then divide the sorted plurality of pieces of target type data. As another example, the processing device 130 may obtain a plurality of field value ranges corresponding to a plurality of field values by diving the connection field based on experience, and store a piece of target type data in one or more field value ranges into a target type data group, thus storing the piece target type data in one or more field value ranges on a data node. Moreover, for a new piece of target type data, the processing device 130 may determine the field value range corresponding to the field value of the connection field in the new piece of target type data, and then store the new piece of target type data on the data node corresponding to the field value range.

The plurality of target type data groups may be obtained by dividing the plurality of pieces of target type data based on the plurality of field values of the connection field, thus the plurality of field values of the connection field of each piece of target type data in each target type data group may be similar. Thus, the index data and target type data corresponding to the similar field values of the connection field may be stored on the same data node, thus the query efficiency may be improved. For example, the query request is "querying data with license plates of 'Chuan A00001' to 'Chuan A00010'". Then the data satisfying the query conditions may be found on one or more data nodes on which the data corresponding to the range is stored, thus improving the query efficiency.

In some embodiments, the processing device 130 may obtain a single query duration of each of the plurality of data nodes in historical query data. If an average single query duration of the plurality of data nodes is greater than a predetermined value, the data stored on the plurality of data nodes may be redistributed. The redistribution may refer to a redistribution of index data and target type data. For example, the index data and target type data stored by the operations 410 to 430 may be restored by dividing the plurality of pieces of target type data in the target type data table into the plurality of target type data groups based on the count of the plurality of data nodes, or by dividing the plurality of pieces of target type data based on the plurality of field values of the connection field to obtain the plurality of target type data groups. As another example, the plurality of field value ranges corresponding to the plurality of field values of the connection field may be divided based on experience, and the index data and target type data stored by placing the target type data in one or more field value ranges on a corresponding target type data group may be redistributed by changing the plurality of field value ranges. In some embodiments, the processing device 130 may also redistribute the index data and target type data in a variety of ways, including, but not limited to, transferring a portion of data stored on each index shard on each data node to other data nodes or other index shards, or collecting all the data to a temporary table and redistributing.

Redistribution may improve the query efficiency of the plurality of data nodes whose average single query duration in historical data is longer than the predetermined value, thereby improving the user experience.

Figure 5:
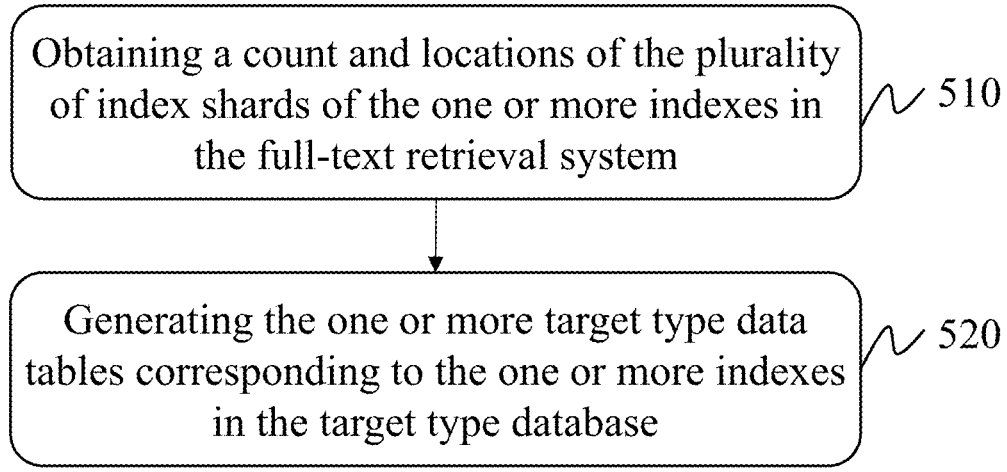
FIG. 5 is a flowchart illustrating an exemplary process of storing index shards and target type data table shards according to some embodiments of the present disclosure.

FIG. 5 is a flowchart illustrating an exemplary process of storing index shards and target type data table shards according to some embodiments of the present disclosure. As shown in FIG. 5, process 500 may include one or more of the following operations. In some embodiments, one or more operations of the process 500 shown in FIG. 5 may be implemented in the application scenario 100 of the system for data query shown in FIG. 1. For example, the process 500 shown in FIG. 5 may be stored in the storage device 140 in the form of instructions, and may be called and/or executed by the processing device 130.

In 510, a count and locations of the plurality of index shards of the one or more indexes in the full-text retrieval system may be obtained.

The locations of the plurality of index shards may refer to locations of the plurality of index shards on the plurality of data nodes. For example, the index shard 0 and the index shard 1 is located on the data node 1.

In some embodiments, data in the one or more indexes may be divided into a plurality of data shards (i.e., the plurality of index shards), and the plurality of index shards may be distributed on the plurality of data nodes. The processing device 130 may obtain the count and locations of the plurality of index shards. For example, as shown in FIG. 6A, the data in the one or more indexes is divided into six index shards (e.g., shard 0, shard 1, shard 2, shard 3, shard 4, and shard 5). The six index shards are distributed on three data nodes. That is, the locations of index shards are: shard 0 and shard 1 are distributed on data node 1, shard 2 and shard 3 are distributed on data node 2, and shard 4 and shard 5 are distributed on data node 3.

In 520, the one or more target type data tables corresponding to the one or more indexes may be generated in the target type database.

In some embodiments, the processing device 130 may generate the one or more target type data tables corresponding to the one or more indexes in the target type database after obtaining the count and locations of the plurality of index shards of the index in the full-text retrieval system. A count and locations of the plurality of target type data table shards in the one or more target type data tables may correspond to the count and locations of the plurality of index shards of the index.

In some embodiments, the processing device 130 may obtain a count of a plurality of target type data table shards to be generated in the one or more target type data tables, and determine whether the count of the plurality of target type data table shards to be generated is a multiple of the count of the plurality of index shards of the one or more indexes. In response to that the count of the plurality of target type data table shards to be generated is a multiple of the count of the plurality of index shards of the one or more indexes, the processing device 130 may obtain an index shard group and at least one target type data table shard group by sorting and grouping the plurality of index shards and the plurality of target type data table shards to be generated. A count of index shards in the index shard group may be the same as a count of target type data table shards to be generated in the at least one target type data table shard group. Then, the processing device 130 may designate a location of one of the plurality of target type data table shards to be generated in the at least one target type data table shard group as a location of one of the index shards in the index shard group, and generate a target type data table shard at the location. The orders of the target type data table shards to be generated in the at least one target type data table shard group may be the same as the orders of the index shards in the index shard group.

For example, as shown in FIG. 6B, when generating the one or more target type data tables corresponding to the one or more indexes in the target type database, the count of target type data table shards to be generated in the target type data tables may be obtained. If the count of the plurality of target type data table shards to be generated in the one or more target type data tables is not a multiple of the count of the plurality of index shards of the one or more indexes (e.g., the count of the plurality of target type data table shards to be generated in the one or more target type data tables is 4, and the count of the plurality of index shards of the one or more indexes is 6), the generation of the one or more target type data tables corresponding to the one or more indexes in the target type database may fail, and the generation process may terminate. If the count of the plurality of target type data table shards to be generated in the one or more target type data tables is a multiple of the count of the plurality of index shards of the one or more indexes (e.g., the count of the plurality of target type data table shards to be generated in the one or more target type data table is 6, and the count of the plurality of index shards of the one or more indexes is 6), the plurality of index shards of the one or more indexes and the plurality of target type data table shards to be generated in the one or more target type data tables may be sorted and grouped. For example, an index shard group: shard 0, shard 1, shard 2, shard 3, shard 4, shard 5, and at least one target type data table shard group: Tablet 0, Tablet 1, Tablet 2, Tablet 3, Tablet 4, and Tablet 5 may be obtained. A location of Tablet 0 may be a location of shard 0, that is, Tablet 0 and shard 0 may be distributed on the data node 1, and Tablet 0 may be generated on the data node 1. Similarly, Tablet 3 may be generated on data node 1, Tablet 1 and Tablet 4 may be generated on the data node 2, and Tablet 2 and Tablet 5 may be generated on the data node 3.

The count and locations of the plurality of index shards in the indexes in the full-text retrieval system may be obtained first, and then the one or more target type data tables corresponding to the one or more indexes may be generated in the target type database. The pressure on the performance of the processing device 130 caused by simultaneously storing the plurality of index shards and the plurality of target type data table shards may be reduced.

It should be noted that the above description of storing the plurality of index shards and the plurality of target type data table shards is merely for illustration, and does not limit the scope of the present disclosure. For those skilled in the art, various modifications and changes may be made to process of storing the plurality of index shards and the plurality of target type data table shards under the guidance of the present disclosure. However, these modifications and changes are still within the scope of the present disclosure.

Figure 7:
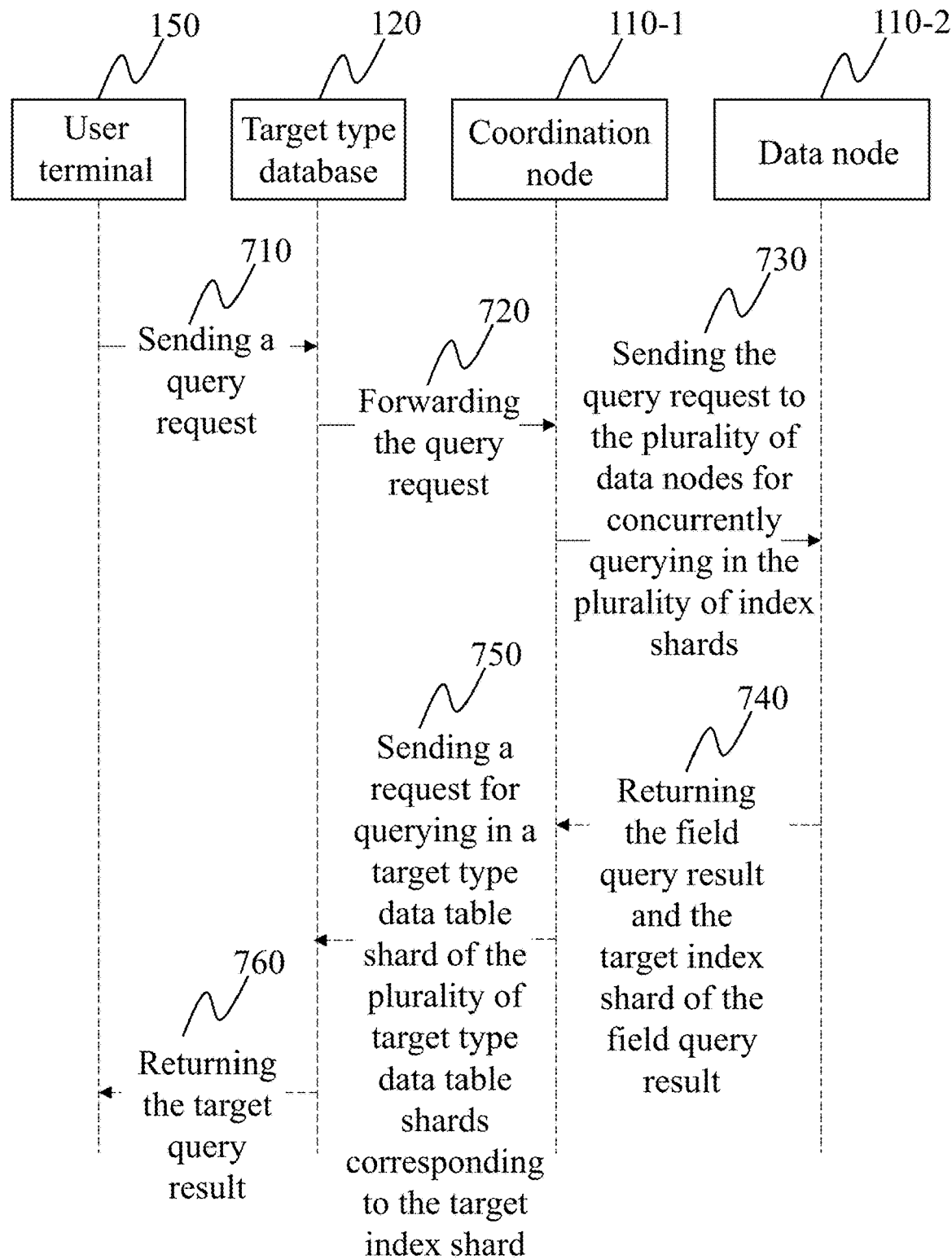
FIG. 7 is a schematic diagram illustrating an exemplary process of data query according to some embodiments of the present disclosure.

FIG. 7 is a schematic diagram illustrating an exemplary process 700 of data query according to some embodiments of the present disclosure. As shown in FIG. 7, the process for data query may include one or more of the following operations.

In 710, the user terminal 150 may send a query request to the target type database 120.

In 720, the target type database 120 may forward the query request to the coordination node 110-1.

In 730, the coordination node 110-1 may send the query request to the plurality of data nodes 110-2 for concurrently querying in the plurality of index shards.

In 740, the plurality of data nodes 110-2 may return the field query result and the target index shard of the field query result to the coordination node 110-1.

In 750, the coordination node 110-1 may send a request for querying in a target type data table shard of the plurality of target type data table shards corresponding to the target index shard to the target type database 120, to perform associated query in the plurality of target type data table shards, and execute the result merging operation.

In 760, the target type database 120 may return the target query result to the user terminal 150.

By concurrently querying in the plurality of index shards, the query speed may be greatly improved, thereby improving the user experience.

Figure 8:
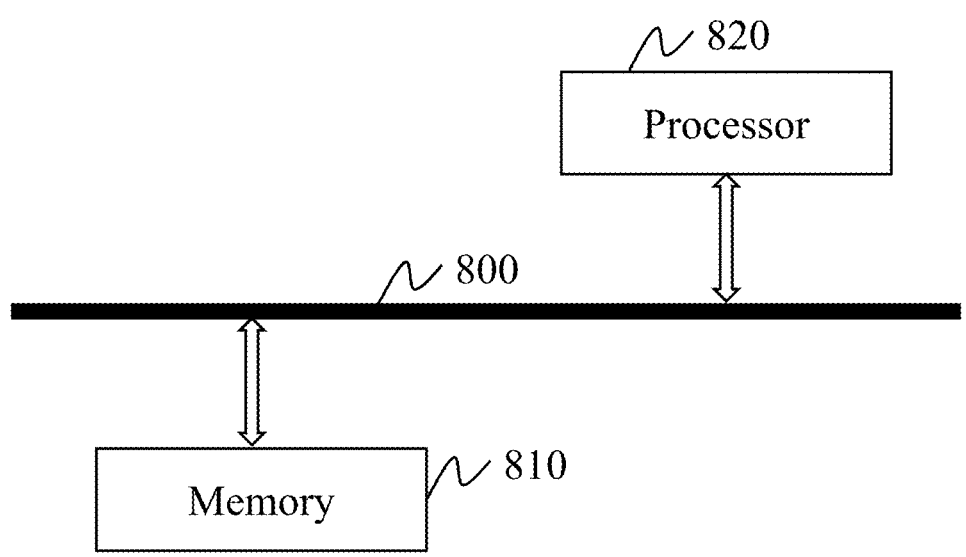
FIG. 8 is a schematic diagram illustrating an exemplary structure of a system for data query according to some embodiments of the present disclosure.

FIG. 8 is a schematic diagram illustrating an exemplary structure of a system for data query according to some embodiments of the present disclosure.

In some embodiments, the system for data query may include at least one processor 820 and a memory 810 connected with the at least one processor 820. The embodiments of the present disclosure may not limit a specific connection medium between the processor 820 and the memory 810. As shown in FIG. 8, taking the connection between the at least one processor 820 and the memory 810 via the bus 800 as an example, the bus 800 may be represented by a thick line in FIG. 8. A connection mode between other components is merely an illustration, and is not limit the scope of the present disclosure. The bus 800 may include an address bus, a data bus, a control bus, or the like. For ease of representation, only one thick line is used in FIG. 8, but it does not mean that there is only one bus or one type of bus. The memory 810 may be the storage device 140 in FIG. 1, and the processor 820 may be the processing device 130 in FIG. 1.

In some embodiments of the present disclosure, the memory 810 may store instructions that can be executed by the at least one processor 820, and the at least one processor 820 may execute the operations for data query described above by calling the instructions stored in the memory 810. The processor 820 may be a control center of the system for data query, which may use various interfaces and lines to connect with various components of the system for data query. Various functions of the system for data query may be realized by executing instructions stored in the memory 810. In some embodiments, the at least one processor 820 may include one or more processing units, and the at least one processor 820 may integrate an application processor and a modem processor. The application processor may mainly deal with the operating system, user interface and application program, and the modem processor may mainly deal with wireless communication. It is understood that the above modem processor may not be integrated into the at least one processor 820. In some embodiments, the at least one processor 820 and the memory 810 may be implemented on one chip. In some embodiments, the at least one processor 820 and the memory 810 may be implemented on separate chips.

As a nonvolatile computer-readable storage medium, the memory 810 may be configured to store nonvolatile software programs, nonvolatile computer executable programs, and modules. The memory 810 may include at least one type of storage medium. For example, the memory 810 may include a flash memory, a hard disk, a multimedia card, a card type memory, a random access memory (RAM), a static random access memory (SRAM), a programmable read only memory (PROM), a read only memory (ROM), an electrically erasable programmable read only memory (EEPROM), a magnetic memory, a disk, an optical disk, or the like. The memory 810 may be any other medium that may be used to carry or store desired program code in the form of instructions or data structures and may be accessed by a computer, which may not be limited in the present disclosure. The memory 810 in the embodiment of the present disclosure may be a circuit or any other device capable of realizing the storage functions for storing program instructions and/or data.

In some embodiments of the present disclosure, the at least one processor 820 may be a generic processor, for example, a central processing unit (CPU), a digital signal processor, an application specific integrated circuit, a field programmable gate array or other programmable logic devices, discrete gates or transistor logic devices, and discrete hardware components, which may implement or execute the methods, operations, and logic diagrams disclosed in the embodiments of the present disclosure. The generic processor may be a microprocessor or any conventional processor. The operations of the method for data query disclosed in connection with the embodiments of the present disclosure may be directly embodied in the completion of the hardware processor or the combination of hardware and software modules in the processor.

By designing and programming the at least one processor 820, the code of the method for data query described in the embodiments of the present disclosure may be solidified into a chip. Thus, the chip may execute the operations of the method for data query described above when running.

In some embodiments, a device for data query may include a processor and a memory. The memory may be configured to store instructions. When the instructions are executed by the processor, the device may implement the method for data query.

In some embodiments, a computer-readable storage medium may store computer instructions, when a computer reads the computer instructions, the computer may execute the method for data query.

The possible beneficial effects of the embodiments in the present disclosure may include, but may not be limited to: (1) By combining the full-text retrieval system with the target type database, the second query condition may be determined based on the field query result satisfying the first query condition after the full-text retrieval system is retrieved to determine the one or more index shards on which data satisfying the first query condition is stored. Then, in querying the one or more target type data table shards corresponding to the target index shard of the plurality of index shards in the target type database to determine the target query result satisfying the second query condition, both the full-text retrieval and association retrieval may be suitable for use, and the user experience may be improved. (2) By using a first target serial number of an index shard of the plurality of index shards used to store the index data and a second target serial number of a target type data table shard of the plurality of target type data table shards used to store the target type data, and storing the index shard of the plurality of index shards corresponding to the third remainder and the target type data table shard of the plurality of target type data table shards corresponding to the fourth remainder on a same data node of the plurality of data nodes, the data with the same route value in the one or more indexes and the one or more target type data tables may be stored in the same data node. Therefore, there is no need to migrate data across nodes, the network overhead may be reduced and retrieval performance may be improved. (3) By obtaining the count and locations of the plurality of index shards in the one or more indexes of the full-text retrieval system, and then generating the one or more target type data tables corresponding to the one or more indexes in the target type database, the pressure on the performance of the processing device 130 caused by simultaneously storing the plurality of index shards and the plurality of target type data table shards may be reduced. (4) By concurrently querying in the plurality of index shards, the query speed may be greatly improved, and the user experience may be improved.

Having thus described the basic concepts, it may be rather apparent to those skilled in the art after reading this detailed disclosure that the foregoing detailed disclosure is intended to be presented Merely by way of example and is not limiting. Various alterations, improvements, and modifications may occur and are intended to those skilled in the art, though not expressly stated herein. These alterations, improvements, and modifications are intended to be sug- gested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A method for data query, comprising:
obtaining a query request;
determining a first query condition based on the query request;
obtaining a field query result relating to a connection field by querying, based on the first query condition, in a full-text retrieval system, wherein the full-text retrieval system stores one or more indexes;
determining a second query condition based on the field query result; and
obtaining a target query result by querying, based on the second query condition, in a target type database, wherein the target type database stores one or more target type data tables, and the one or more indexes are associated with data in the one or more target type data tables via the connection field, wherein
the one or more indexes include a plurality of index shards stored in distributed locations on a plurality of data nodes; and
the querying, based on the first query condition, in the full-text retrieval system includes:
performing a scrolling retrieval on the plurality of index shards in the plurality of data nodes based on the first query condition simultaneously; and
in response to that an amount of data satisfying the first query condition is no less than a first threshold, terminating the scrolling retrieval on the plurality of index shards in the plurality of data nodes.

2. The method of claim 1, wherein the field query result relating to the connection field includes a row key value corresponding to the connection field.

3. The method of claim 1, wherein
the target type database includes a distributed database, the one or more target type data tables including a plurality of target type data table shards stored in the distributed locations on the plurality of data nodes; and
the plurality of index shards correspond to the plurality of target type data table shards respectively.

4. The method of claim 3, wherein a count of the plurality of target type data table shards is a multiple of a count of the plurality of index shards.

5. The method of claim 3, wherein the obtaining a field query result relating to a connection field includes:
sending the query request to the plurality of data nodes; and obtaining the field query result and a target index shard of the plurality of index shards where the field query result is located by querying, based on the first query condition, in the plurality of index shards.

6. The method of claim 5, wherein the querying, based on the second query condition, in the target type database includes:
   querying, in a target type data table shard of the plurality of target type data table shards corresponding to the target index shard based on the second query condition.

7. The method of claim 3, wherein an index shard of the plurality of index shards and a target type data table shard of the plurality of target type data table shards corresponding to the index shard are stored in a same data node of the plurality of data nodes.

8. The method of claim 7, wherein the querying, based on the second query condition, in the target type database includes:
   performing a scrolling retrieval on one or more candidate target type data table shards of the plurality of target type data table shards on the plurality of data nodes based on the second query condition simultaneously, the one or more candidate target type data table shards corresponding to one or more index shards of the plurality of index shards on which data satisfying the first query condition is stored; and
   in response to that an amount of data satisfying the second query condition is no less than a second threshold, terminating the scrolling retrieval on the one or more candidate target type data table shards.

9. The method of claim 7, wherein the one or more indexes stores index data, the one or more target type data tables store target type data, the index data and the target type data include the connection field, and the index data and the target type data is stored by:
   determining a plurality of first shard serial numbers corresponding to the plurality of index shards and a plurality of second shard serial numbers corresponding to the plurality of target type data table shards;
   determining a route value based on the field query result relating to the connection field; and
   determining, based on the route value, a first target serial number of an index shard of the plurality of index shards used to store the index data and a second target serial number of a target type data table shard of the plurality of target type data table shards used to store the target type data.

10. The method of claim 9, wherein the determining, based on the route value, a first target serial number of an index shard of the plurality of index shards used to store the index data and a second target serial number of a target type data table shard of the plurality of target type data table shards used to store the target type data includes:
   determining, based on the route value, using a data routing algorithm, the first target serial number of the index shard of the plurality of index shards used to store the index data and the second target serial number of the target type data table shard of the plurality of target type data table shards used to store the target type data, including:
   obtaining a Hash value by performing a Hash operation on the route value;
   obtaining a first remainder by dividing the Hash value by a count of the plurality of index shards;
   designating the first remainder as the first target serial number of the index shard used to store the index data;
   obtaining a second remainder by dividing the Hash value by a count of the plurality of target type data table shards; and
   designating the second remainder as the second target serial number of the target type data table shard used to store the target type data.

11. The method of claim 9, wherein the index shard and the target type data table shard are stored by:
   obtaining a plurality of third remainders and a plurality of fourth remainders by dividing the plurality of first shard serial numbers and the plurality of second shard serial numbers by a count of the plurality of data nodes, respectively;
   determining whether a third remainder of the plurality of third remainders is the same as a fourth remainder of the plurality of fourth remainders; and
   in response to that the third remainder and the fourth remainder are the same, storing the index shard of the plurality of index shards corresponding to the third remainder and the target type data table shard of the plurality of target type data table shards corresponding to the fourth remainder on a same data node of the plurality of data nodes.

12. The method of claim 9, wherein the index shard and the target type data table shard are stored by:
   obtaining a count and locations of the plurality of index shards of the one or more indexes in the full-text retrieval system; and
   generating the one or more target type data tables corresponding to the one or more indexes in the target type database, wherein a count and locations of the plurality of target type data table shards of the one or more target type data tables correspond to the count and the locations of the plurality of index shards of the one or more indexes.

13. The method of claim 12, wherein the generating the one or more target type data tables corresponding to the one or more indexes in the target type database includes:
   obtaining a count of a plurality of target type data table shards to be generated in the one or more target type data tables;
   determining whether the count of the plurality of target type data table shards to be generated is a multiple of the count of the plurality of index shards of the one or more indexes;
   in response to that the count of the plurality of target type data table shards to be generated is a multiple of the count of the plurality of index shards of the one or more indexes, obtaining an index shard group and at least one target type data table shard group by sorting and grouping the plurality of index shards and the plurality of target type data table shards to be generated, wherein a count of index shards in the index shard group is the same as a count of target type data table shards to be generated in the at least one target type data table shard group;
   designating a location of one of the plurality of target type data table shards to be generated in the at least one target type data table shard group is a location of one of the index shards in the index shard group; and
   generating a target type data table shard at the location, wherein orders of the target type data table shards to be generated in the at least one target type data table shard group is the same as orders of the index shards in the index shard group.

14. A system for data query, comprising at least one processor and a memory connected with the at least one processor, the at least one processor comprising:
- an acquisition module, configured to obtain a query request;
- a first determination module, configured to determine a first query condition based on the query request;
- a first query module, configured to obtain a field query result relating to a connection field by querying, based on the first query condition, in a full-text retrieval system, wherein the full-text retrieval system stores one or more indexes;
- a second determination module, configured to determine a second query condition based on the field query result; and
- a second query module, configured to obtain a target query result by querying, based on the second query condition, in a target type database, wherein the target type database stores one or more target type data tables, and the one or more index are associated with data in the one or more target type data tables via the connection field, wherein
  - the one or more indexes include a plurality of index shards stored in distributed locations on a plurality of data nodes; and
  - the querying, based on the first query condition, in the full-text retrieval system includes:
    - performing a scrolling retrieval on the plurality of index shards in the plurality of data nodes based on the first query condition simultaneously; and
    - in response to that an amount of data satisfying the first query condition is no less than a first threshold, terminating the scrolling retrieval on the plurality of index shards in the plurality of data nodes.

15. The system of claim 14, wherein the field query result relating to the connection field includes a row key value corresponding to the connection field.

16. The system of claim 14, wherein
the target type database includes a distributed database, the one or more target type data tables including a plurality of target type data table shards stored in the distributed locations on the plurality of data nodes;
the plurality of index shards correspond to the plurality of target type data table shards respectively.

17. The system of claim 16, wherein a count of the plurality of target type data table shards is a multiple of a count of the plurality of index shards.

18. The system of claim 16, wherein the first query module is further configured to:
- send the query request to the plurality of data nodes; and
- obtain the field query result and a target index shard of the plurality of index shards where the field query result is located by querying, based on the first query condition, in the plurality of index shards.

19. A non-transitory computer readable medium storing instructions, the instructions, when executed by at least one processor, causing the at least one processor to implement a method comprising:
- obtaining a query request;
- determining a first query condition based on the query request;
- obtaining a field query result relating to a connection field by querying, based on the first query condition, in a full-text retrieval system, wherein the full-text retrieval system stores one or more indexes;
- determining a second query condition based on the field query result; and
- obtaining a target query result by querying, based on the second query condition, in a target type database, wherein the target type database stores one or more target type data tables, and the one or more indexes are associated with data in the one or more target type data tables via the connection field, wherein
the one or more indexes include a plurality of index shards stored in distributed locations on a plurality of data nodes; and
the querying, based on the first query condition, in the full-text retrieval system includes:
  - performing a scrolling retrieval on the plurality of index shards in the plurality of data nodes based on the first query condition simultaneously; and
  - in response to that an amount of data satisfying the first query condition is no less than a first threshold, terminating the scrolling retrieval on the plurality of index shards in the plurality of data nodes.

* * * * *